Inventors
Edward A. Newman
John B Stringer
By: Stevens, Davis, Miller & Mosher, Attorneys Aug. 7, 1962 E. A. NEWMAN ET AL 3,048,334

ELECTRICAL DIGITAL COMPUTING ENGINES

Filed Aug. 10, 1959 4 Sheets-Sheet 2

*Inventors*
Edward A. Newman
John B. Stringer
By: Stevens, Davis, Miller & Mosher
*Attorneys*

ELECTRICAL DIGITAL COMPUTING ENGINES

Inventors
Edward A. Newman
John B. Stringer
By: Stevens, Davis, Miller & Mosher, Attorneys Inventors
Edward A. Newman
John B. Stringer
By: Stevens, Davis, Miller & Mosher, Attorneys

United States Patent Office 3,048,334

Patented Aug. 7, 1962

3,048,334

ELECTRICAL DIGITAL COMPUTING ENGINES

Edward Arthur Newman, Oxshot, and John Bentley Stringer, Hanworth, England, assignors to National Research Development Corporation, London, England, a British corporation Filed Aug. 10, 1959, Ser. No. 832,582
Claims priority, application Great Britain Aug. 18, 1958
9 Claims. (Cl. 235—164)

This invention relates to electrical digital computing engines.

In electrical digital computing engines the process of multiplication usually either takes a long time to execute compared with the process of addition or requires for its execution a considerable quantity of apparatus or is a compromise between these two alternatives. An example of a slow multiplier using relatively simple apparatus is the multiplier described in United Kingdom patent specification No. 717,114; and an example of a somewhat faster multiplier using apparatus that is somewhat more complicated is described in copending patent application Serial No. 754,230, filed August 11, 1958.

It is an object of the present invention to provide a fast multiplier using relatively little equipment.

According to the present invention there is provided a multiplier for an electrical digital computing engine including a first store in which digits of a first word are stored in alternate digit positions and are shifted in a direction in which the most significant digit leads, a second store in which digits of a second word are stored in alternate digit positions and are shifted in a direction in which the least significant digit leads and a plurality of multiplier means, each connected between a digit position of the first store and a digit position of the second store, for multiplying digits together, whereby products of the same significance are all formed in the same multiplier means.

The mathematical basis of the invention is as follows.

Consider the multiplication of two numbers $$a+Rb+R^2c+R^3d$$

and $e+Rf+R^2g+R^3h$ written in a number system with radix R. The product of these two numbers is $$ae+R(af+be)+R^2(ag+bf+ce)+R^3(ah+bg+cf+de)$$
$$+R^4(bh+cg+df)+R^5(ch+dg)+R^6dh$$

To generate this product we can write the numbers in alternate columns of a table, multiplying together digits in the same column and shifting the numbers when the digit multiplication is complete: this is done in seven stages:

| Column number | 0 | 1 | 2 | 3 | 4 | 5 | 6 | 7 | 8 | 9 | 10 | 11 | 12 |
|---|---|---|---|---|---|---|---|---|---|---|---|---|---|
| Stage I | *a* | | *b* | | *c* | | *d* | | | | | | |
| | | | | | | | *e* | | *f* | | *g* | | *h* |

Here the product generated is *de*. The numbers are shifted:

| Column number | 0 | 1 | 2 | 3 | 4 | 5 | 6 | 7 | 8 | 9 | 10 | 11 | 12 |
|---|---|---|---|---|---|---|---|---|---|---|---|---|---|
| Stage II | | *a* | | *b* | | *c* | | *d* | | | | | |
| | | | | | | *e* | | *f* | | *g* | | *h* | |

and the products *ce* and *df* are generated. This process is continued and the complete table is as follows:

*Table I*

| Column number X | 0 | 1 | 2 | 3 | 4 | 5 | 6 | 7 | 8 | 9 | 10 | 11 | 12 |
|---|---|---|---|---|---|---|---|---|---|---|---|---|---|
| Stage I | a | --- | *b* | --- | *c* | --- | *d* | --- | --- | --- | --- | --- | --- |
| | --- | --- | --- | --- | --- | --- | *e* | --- | *f* | --- | *g* | --- | *h* |
| Stage II | --- | *a* | --- | *b* | --- | *c* | --- | *d* | --- | --- | --- | --- | --- |
| | --- | --- | --- | --- | --- | *e* | --- | *f* | --- | *g* | --- | *h* | --- |
| Stage III | --- | --- | *a* | --- | *b* | --- | *c* | --- | *d* | --- | --- | --- | --- |
| | --- | --- | --- | --- | *e* | --- | *f* | --- | *g* | --- | *h* | --- | --- |
| State IV | --- | --- | --- | *a* | --- | *b* | --- | *c* | --- | *d* | --- | --- | --- |
| | --- | --- | --- | *e* | --- | *f* | --- | *g* | --- | *h* | --- | --- | --- |
| Stage V | --- | --- | --- | --- | *a* | --- | *b* | --- | *c* | --- | *d* | --- | --- |
| | --- | --- | *e* | --- | *f* | --- | *g* | --- | *h* | --- | --- | --- | --- |
| Stage VI | --- | --- | --- | --- | --- | *a* | --- | *b* | --- | *c* | --- | *d* | --- |
| | --- | *e* | --- | *f* | --- | *g* | --- | *h* | --- | --- | --- | --- | --- |
| Stage VII | --- | --- | --- | --- | --- | --- | *a* | --- | *b* | --- | *c* | --- | *d* |
| | *e* | --- | *f* | --- | *g* | --- | *h* | --- | --- | --- | --- | --- | --- |

Thus no products are generated in columns 0, 1, 2, 10, 11 or 12, but:

In column 3 the product *ae* is generated;
In column 4 the products *af* and *be* are generated;
In column 5 the products *ag*, *bf* and *ce* are generated;
In column 6 the products *ah*, *bg*, *cf* and *de* are generated;
In column 7 the products *bh*, *cg* and *df* are generated;
In column 8 the products *ch* and *dg* are generated; and
In column 9 the product *dh* is generated.

The sum of the products in each column, therefore, provide one of the coefficients of the required products of the two numbers. Furthermore, all of the required coefficients are provided, and these coefficients are in order; column 3 provides the coefficient of $R^0$, column 4 provides the coefficient of $R^1$, column 5 provides the coefficient of $R^2$, column 6 provides the coefficient of $R^3$, column 7 provides the coefficient of $R^4$, column 8 provides the coefficient of $R^5$ and column 9 provides the coefficient of $R^6$. These coefficients are not necessarily, of course, the digits of the product, for any of the coefficients (except the coefficients $R^0$ and $R^6$) may be greater than R, necessitating a carry-over of a digit to the next higher digit place.

The notation used in the present specification is the well-known Turing notation described in U.K. patent specification No. 717,114 except that the now more familiar D-shaped symbols are used to indicate delay units instead of the triangular symbols used in that specification.

An embodiment of the invention will now be more particularly described with reference to the accompanying drawings in which.

Figure 1:
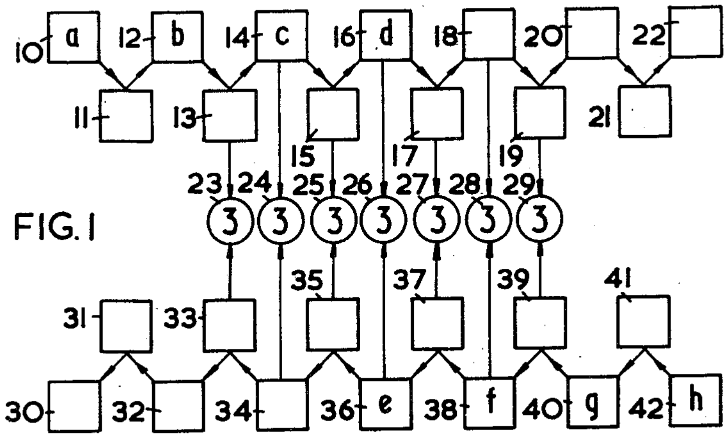
FIGURE 1 is a circuit diagram of a multiplier in the binary scale of notation suitable for an electrical digital computing engine and shown in the barest outline.

In FIGURE 1, thirteen registers 10, 11, 12, 13, 14, 15, 16, 17, 18, 19, 20, 21 and 22 are connected in cascade. Seven 3-gates 23, 24, 25, 26, 27, 28 and 29 are arranged in the manner shown so that an output from each of the registers 13, 14, 15, 16, 17, 18 and 19 is applied to a separate 3-gate 23, 24, 25, 26, 27, 28 and 29 respectively. Thirteen further registers 30, 31, 32, 33, 34, 35, 36, 37,

38, 39, 40, 41 and 42 are arranged in cascade as shown, the sense of the cascade being in the opposite direction to that of the registers 10, 11, 12, 13, 14, 15, 16, 17, 18, 19, 20, 21 and 22. An output from each of the registers 33, 34, 35, 36, 37, 38 and 39 is applied to a separate 3-gate 23, 24, 25, 26, 27, 28 and 29 respectively.

The action of the circuit is as follows. First the two 4-digit numbers to be multiplied are set up on the registers as shown, for example, from a main store (not shown) via a plurality of gates (not shown), where the numbers are, as above, $$a+Rb+R^2c+R^3d \text{ and } e+Rf+R^2g+R^3h$$

respectively, and $R=2$. Thus the separate digits $a$, $b$, $c$, $d$, $e$, $f$, $g$ and $h$ are set up on the registers 10, 12, 14, 16, 36, 38, 40 and 42 respectively. A first timing pulse (not shown) is applied to each of the 3-gates 24, 26 and 28. If the contents of the registers 16 and 36 are both "ones," i.e. if $d=e=1$ then the 3-gate 26 will be opened. [No other 3-gate will be opened at this time, for the 3-gate 23, 25, 27 and 29 receive no input pulses and the 3-gates 24 and 26 each receive at most two input pulses.] In this way the 3-gate 26 generates the number $de$.

In the next unit of time the digits $a$, $b$, $c$ and $d$ are transferred from the registers 10, 12, 14 and 16 respectively to the registers 11, 13, 15 and 17 respectively and the digits $e$, $f$, $g$ and $h$ are transferred from the registers 36, 38, 40 and 42 respectively to the registers 35, 37, 39 and 41 respectively. A second timing pulse (not shown) is applied to each of the 3-gates 23, 25, 27 and 29. As before, the 3-gates 23 and 29 will give no output and the gates 25 and 27 will give outputs corresponding to the numbers $ce$ and $df$ respectively. Meanwhile the output, corresponding to the number $de$, of the 3-gate 26 is stored in a further register (not shown).

At this point it is convenient to compare the process with the arithmetical process set forth in Table I, the columns of which correspond to elements of FIGURE 1 in the following manner:

*Table II*

| Column of Table I | Elements of Figure 1 | |
|---|---|---|
| | Registers | 3-gates |
| 0 | 10, 30 | |
| 1 | 11, 31 | |
| 2 | 12, 32 | |
| 3 | 13, 33 | 23 |
| 4 | 14, 34 | 24 |
| 5 | 15, 35 | 25 |
| 6 | 16, 36 | 26 |
| 7 | 17, 37 | 27 |
| 8 | 18, 38 | 28 |
| 9 | 19, 39 | 29 |
| 10 | 20, 40 | |
| 11 | 21, 41 | |
| 12 | 22, 42 | |

The parts of the process corresponding to stages I and II of Table I have been described in detail, and the remaining parts will be described in less detail.

The digits $a$, $b$, $c$ and $d$ are shifted one place to the right again, to occupy the register 12, 14, 16 and 18 respectively, and the digits $e$, $f$, $g$ and $h$ are shifted one place to the left again, to occupy the registers 34, 36, 38 and 40 respectively. The above mentioned first timing pulse is applied to the 3-gates 24, 26 and 28 which thereby generate the numbers $be$, $cf$ and $dg$ respectively. Meanwhile the numbers previously generated (i.e. $de$, $ce$ and $df$) are stored in further registers (not shown). The process continues until all the required numbers have been generated. An adder (not shown) is provided at each 3-gate to add together all the numbers emanating from the 3-gate. This addition may conveniently be done during the unit of time when the 3-gate concerned is not producing a number.

It will be noticed that once a digit has reached either of the registers 20 or 32 it is no longer required for multiplication purposes, and so, unless the multiplier or the multiplicand is subsequently required, the registers 20, 21, 22, 30, 31 and 32 are redundant. In the subsequent description, therefore, these registers will not be shown.

Figure 2:
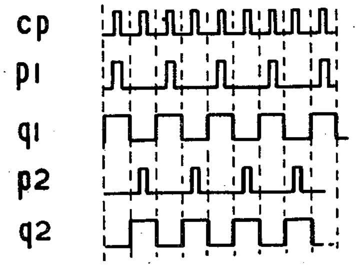
FIGURE 2 is a set of graphs representing waveforms used in the embodiment.

FIGURE 2 is a set of graphs representing waveforms used in the embodiments. The first graph is that of the familiar clock pulses, $cp$, which are narrow pulses occurring once in every unit of time. The clock pulses occur at the centre of the units of time. Alternate clock pulses are called $p1$ pulses, and wide $p1$ pulses, i.e. pulses occupying the whole of each unit of time during which a $p1$ pulse occurs, are called $q1$ pulses. Clock pulses which are not $p1$ pulses are called $p2$ pulses, and wide $p2$ pulses i.e. pulses occupying the whole of each unit of time during which a $p2$ pulse occurs, are called $q2$ pulses. It will be seen that the $q2$ pulse train is the negation of the $q1$ pulse train, i.e. at any instant either a $q1$ or a $q2$ pulse is on, but not both.

Figure 3:
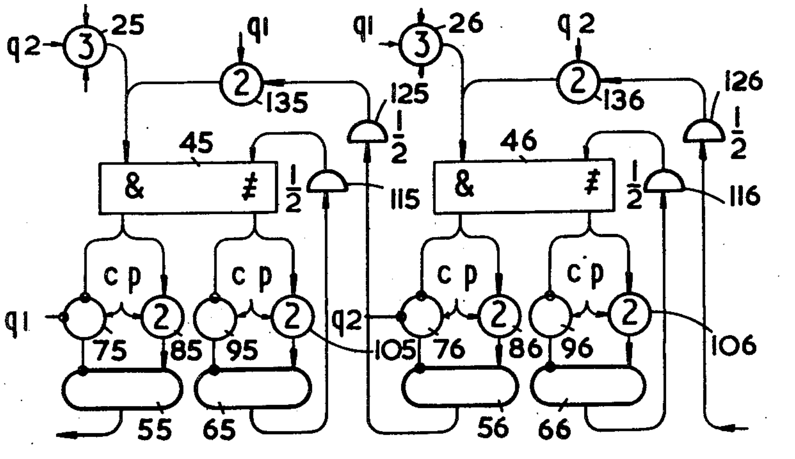
FIGURE 3 is a circuit diagram of another part of the multiplier of FIGURE 1.

FIGURE 3 is a circuit diagram of another part of the multiplier shown in FIGURE 1, and shows a typical pair of 3-gates, 25 and 26 of FIGURE 1. The output of each gate is applied to one input of a separate half adder, 45 and 46 respectively. The (and) output of each half-adder is applied to a trigger 55 and 56 respectively via gates 75, 85 and 76, 86 respectively, and the "not-equivalent" output of each half-adder is applied to a trigger 65 and 66 respectively via gates 95, 105 and 96, 106 respectively. The gates 75, 76, 95 and 96 are inhibiting gates with inhibiting inputs from the half-adders and ordinary inputs from a source of clock pulses. The gates 75 and 76 also have inhibiting inputs from sources of $q1$ and $q2$ pulses respectively. The gates 85, 86, 105 and 106 are 2-gates each having an input from the half-adder and from a source of clock pulses. The outputs from the 2-gates are connected to put the triggers on and the outputs from the inhibiting gates are connected to put the trigger off.

The output of each trigger 65 and 66 is applied to an input of the half-adder 45 and 46 respectively different from the input from the 3-gate 25 and 26 respectively via half-unit delays 115 and 116 respectively. The output of the trigger 56 is applied to the same input of the half-adder 45 as the output of the 3-gate 25 via a half-unit delay 125 and a 2-gate 135. Similarly the output of a trigger 57 (which is not shown in FIGURE 3 but corresponds to the trigger 55 as applied to the 3-gate 27 of FIGURE 1) is applied to the same input of the half-adder 46 as the output of the 3-gate 26 via a half-unit dely 126 and a 2-gate 136. Sources of $q1$ and $q2$ pulses are applied separately to the 2-gates 135 and 136 respectively. Similarly the output of the trigger 55 is applied to a half-adder 44 (which is not shown in FIGURE 3 but corresponds to the half-adder 46 as applied to the 3-gate 24 of FIGURE 1).

The action of this circuit is to add together all the pulses arriving at each 3-gate, as follows. In the quiescent state all the triggers 55, 56, 65 and 66 remain off. This is arranged to be done at the conclusion of each multiplication operation. The first pulse to arrive at the left-hand input of the half-adder 46 will cause this half-adder to emit a pulse at its "not equivalent" output. This will cause the trigger 66 to be put on via the gate 106 at the next clock pulse, i.e. half a digit period later (since the input gates 26 and 136 are timed with $q$ pulses). A further half-digit period later (i.e. at the beginning of the next $q$ pulse) the delay 116 will begin to emit the trigger signal, and unless a further pulse appears at the left-hand input of the half-adder 46 the "not equivalent" output will continue to emit a signal. Thus the output of the gate 26 is stored until a further signal appears at the left-hand input of the half-adder 46. When this happens it will be contemporaneous with the signal from the trigger 66 at the right-hand input, and will cause the trigger 56 to be put on via the gate 86 and the trigger 66 to be put off via the gate 96 at the next clock pulse. The trigger 56 is put off at every clock pulse except those occurring in $q2$ time, i.e. at every $p1$ pulse, unless the half-adder 46 gives an "and" ouput. Thus the output of the trigger 56, delayed half a digit by the delay 125, is always on for the duration of a $q1$ pulse at the gate 135 (when the trigger 56 is on) and a carry digit is propagated from the half-adder 46 to the half-adder 45 while the latter cannot receive a pulse from its associated 3-gate 25 because this gate is opened by a $q2$ pulse. By this means the number of times that a 3-gate is opened is counted, and carry digits are propagated. At the end of the multiplication all that remains to be done is the propagation of the carry digits still stored in the triggers 55, 56 et cetera to the left and the reading of the product on the trigger 65, 66 et cetera.

Figure 4:
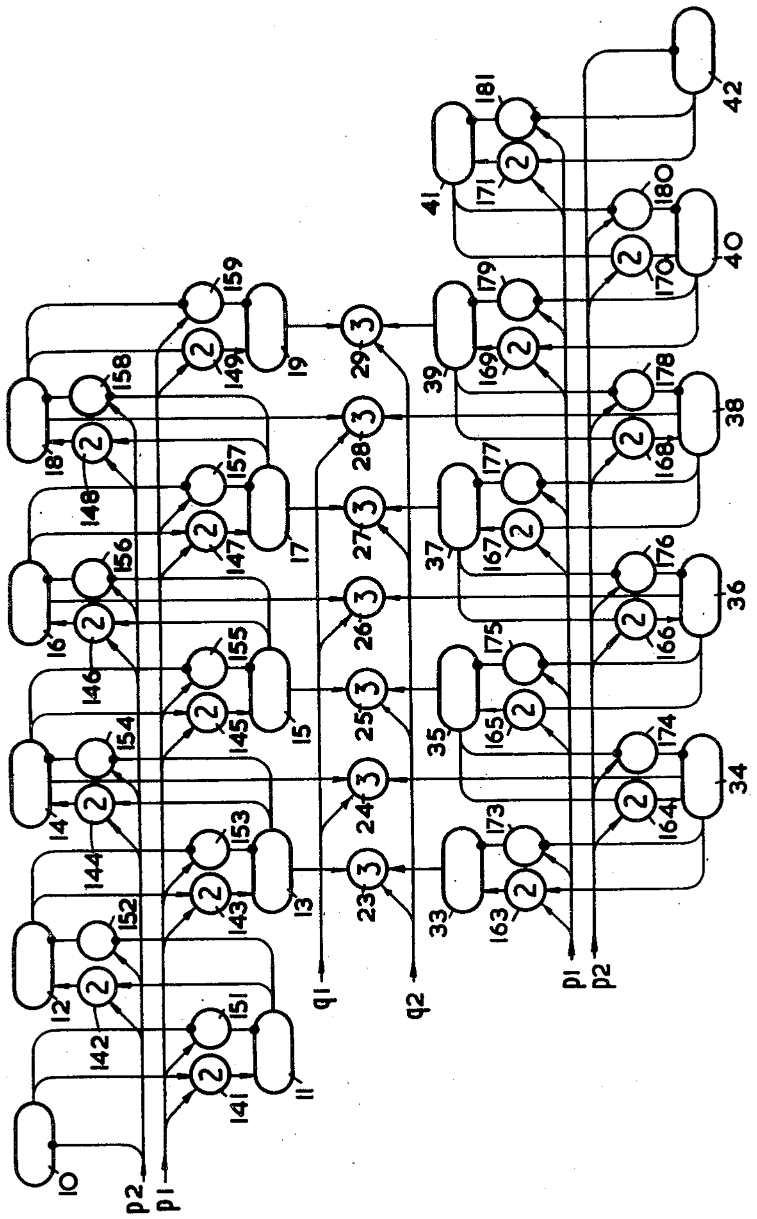
FIGURE 4 is a circuit diagram of the multiplier of FIGURE 1 shown in greater detail.

FIGURE 4 is a circuit diagram of a multiplier shown in greater detail, and corresponds roughly to FIGURE 1, showing in more detail the mechanism by which the multiplicand and multiplier are shifted, and the $q$-pulses applied to the 3-gates. The registers 20, 21, 22, 30, 31 and 32 have been omitted as explained above.

The digit originally stored in the register 10, which like each of the registers 11, 12, 13, 14, 15, 16, 17, 18, 19, 33, 34, 35, 36, 37, 38, 39 40 41 and 42 is a trigger is transferred to the register 11 at $p1$ time by means of a $p1$ pulse which puts on the trigger 11 via a gate 141 if the trigger 10 is on and holds off the trigger 11 via a gate 151 if the trigger 10 is off. The same applies mutatis mutandis, to all the registers 10, 11, 12, 13, 14, 15, 16, 17, 18, 19, 33, 34, 35, 36, 37, 38, 39, 40, 41, and 42. Should either of the triggers 10 or 42 be on initially, they are prevented from putting on the triggers 11 or 41 respectively at the second and subsequent $p1$ pulses by being put off by $p2$ pulses as shown.

Figure 5:
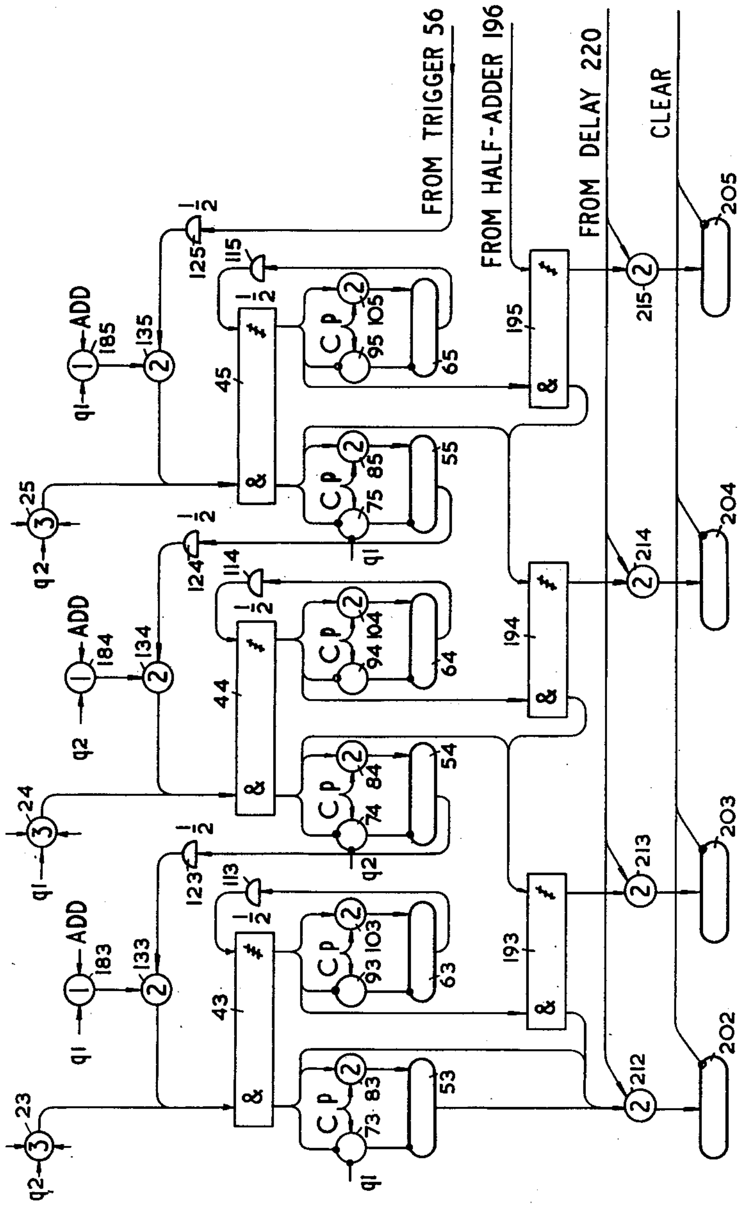
FIGURE 5 is a circuit diagram of another part of the multiplier of FIGURE 1.
Figure 5:
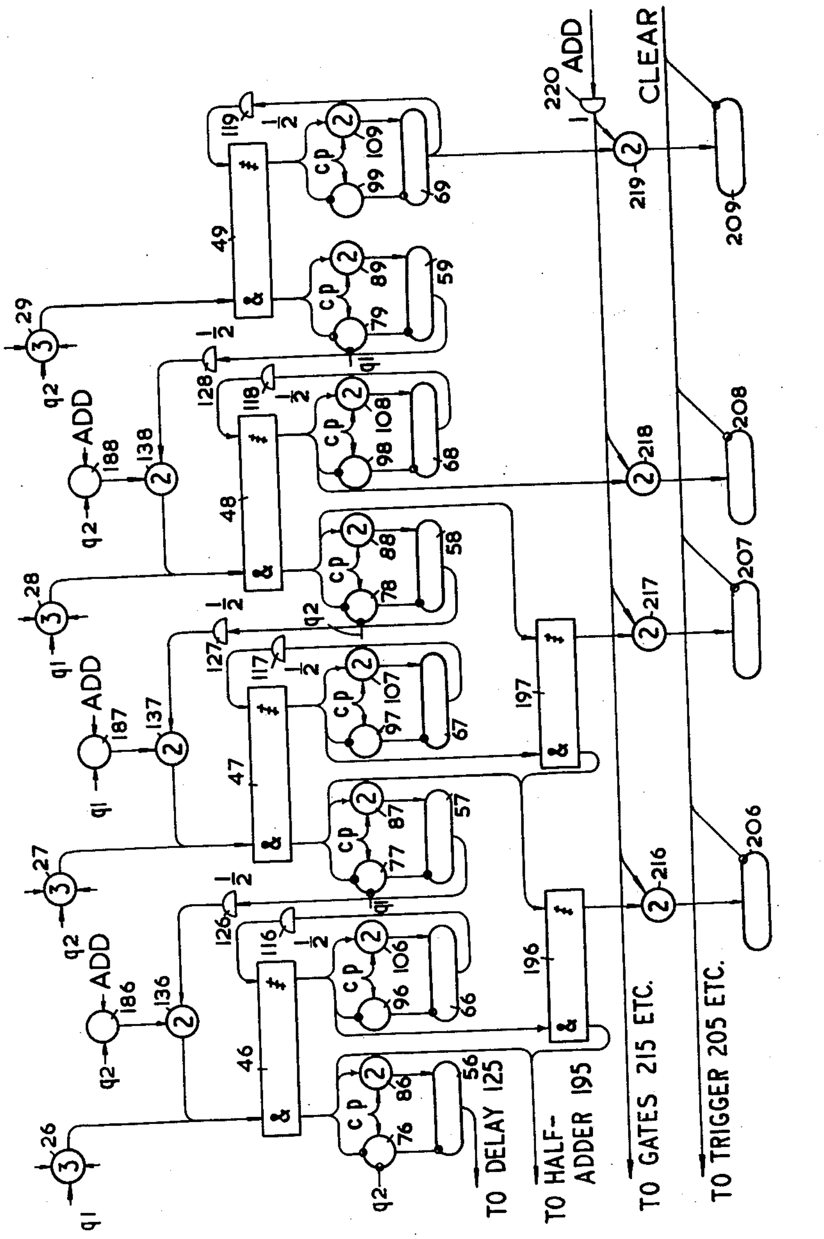

FIGURE 5 is a circuit diagram of another part of the mutliplier shown in FIGURE 4 and contains the circuit of FIGURE 3. This circuit allows the final propagation of the carry digits stored in the triggers 53, 54, 55, 56, 57, 58 and 59 as mentioned with reference to FIGURE 3, and provides a final parallel register for the product.

Most of the circuit is merely the circuit of FIGURE 3 repeated. The elements of FIGURE 3 which are the same as the elements of FIGURE 5 have been given the same references. The left-hand input of the half-adder 49 has an input only from its corresponding 3-gate 29 (in contrast to the other half-adders 43, 44, 45, 46, 47 and 48 each of which has inputs both from its corresponding 3-gate 23, 24, 25, 26, 27 and 28 respectively and from the previous stage via a gate 133, 134, 135, 136, 137 and 138 respectively) since there is no previous stage from which a carry must be propagated. In the same way, any carry from the trigger 53 need not be added to any further carry digit, for arithmetically there can not be more than one carry digit in this place.

The action of the circuit is the same as the action of the circuit in FIGURE 3 until the time that the last 3-gate is opened and all the openings of 3-gates have been recorded on the triggers 53, 54, 55, 56, 57, 58, 59, 63, 64, 65, 66, 67, 68 and 69. At this time the carry digits must be propagated, and this is done by preventing the triggers 53, 54, 55, 56, 57, 58, 59, 63, 64, 65, 66, 67, 68 and 69 from altering their state. For this reason all the clock pulses and all the $p1$, $p2$, $q1$ and $q2$ pulses cease altogether at this time; and a signal called ADD may be generated by any known means and applied to OR-gates 183, 184, 185, 186, 187, and 188 the outputs of which are applied to the gates 133, 134, 135, 136, 137 and 138 respectively.

Thus when the ADD signal is generated the carry digits are propagated by the contents of the pairs of triggers 63 and 54, 64 and 55, 65 and 56, 66 and 57, 67 and 58 and 68 and 59 being added together. The outputs of the half-adders are applied to further half-adders 193, 194, 195, 196 and 197 in the usual way and the result is set up on a product register consisting of triggers 202, 203, 205, 206, 207, 208 and 209, via gates 212, 213, 214, 215, 216, 217, 218, and 219 respectively. The ADD signal, delayed by one digit period at a unit delay 220, opens the gates 212, 213, 214, 215, 216, 217, 218 and 219 and allows the product (which will now be formed) to be set up on the triggers 202, 203, 204, 205, 206, 207, 208 and 209.

At the end of the operation the triggers 202, 203, 204, 205, 206, 207, 208 and 209 may be cleared by a CLEAR signal as shown. This signal may be generated in any known way.

The embodiment described is in an engine using four binary digits for illustration only but it will be immediately clear to those skilled in the art that a practical engine would have many more digits and that the invention is applicable to engines using digits with radices other than 2, for example, decimal computing engines.

We claim:

1. A multiplier for an electrical digital computing engine including a first store in which signals representing digits of a first word are stored in alternate digit positions and a second store in which signals representing digits of a second word are stored in alternate digit positions, a plurality of multiplier means each connected between a consecutive digit position of the said first store and a consecutive digit position of the said second store, means for shifting the said signals in the said first store in a direction in which the said signal representing the most significant digit of the said first word leads, means for shifting the said signals in the said second store in a direction in which the said signal representing the least significant digit of the said second word leads and a separate output from each said multiplier means, each said separate output carrying signals representing products of separate significance.

2. A multiplier as claimed in claim 1 and in which either said store consists of a plurality of triggers with interconnections including means for shifting the said signals representing the said word stored in the said store.

3. A multiplier as claimed in claim 2 and in which the said means for shifting the said signals representing the said word stored in either said stores includes a plurality of gates controlled by timing signals.

4. A multiplier as claimed in claim 1 and in which the said means for shifting the said signals representing the said word stored in either store includes a plurality of gates controlled by timing signals.

5. A multiplier as claimed in claim 1 and in which each said store comprises means to store binary signals.

6. A multiplier as claimed in claim 5 and in which each said multiplier means is a coincidence gate.

7. A multiplier as claimed in claim 6 and in which the output of each said multiplier means is connected to a half-adder.

8. A multiplier is claimed in claim 7 and in which the "sum" output of each said half-adder is connected to a sum register and the "carry" output of each said half-adder is connected to a carry register.

9. A multiplier as claimed in claim 8 and in which the output of a said carry register is connected to the said half-adder to which the output of the said multiplier means of next greater significance is connected and including means for propagating carry digits to the said half-adder to which the output of the said multiplier means of next greater significance is connected at a time intermediate between times when the said multiplier means of next greater significance produces an output signal.

References Cited in the file of this patent

UNITED STATES PATENTS

| | | |
|---|---|---|
| 2,822,131 | Aigrain | Feb. 4, 1958 |
| 2,890,829 | Logan | June 16, 1959 |